US 6,659,568 B2

(12) United States Patent
Wandel

(10) Patent No.: US 6,659,568 B2
(45) Date of Patent: Dec. 9, 2003

(54) METHOD AND DEVICE FOR CONTROLLING A PUMP OF A BRAKE SYSTEM

(75) Inventor: Helmut Wandel, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/319,025

(22) Filed: Dec. 13, 2002

(65) Prior Publication Data
US 2003/0080611 A1 May 1, 2003

Related U.S. Application Data

(63) Continuation of application No. 09/552,867, filed on Apr. 20, 2000, now Pat. No. 6,499,813.

(30) Foreign Application Priority Data

Apr. 20, 1999 (DE) .......................................... 199 17 904

(51) Int. Cl.[7] ................................................. B60T 8/42
(52) U.S. Cl. .................... 303/115.4; 303/11; 303/115.2
(58) Field of Search ............................... 303/115.4, 11, 303/116.1, 10, 157, 158, 115.2, 113.4, 122; 701/71

(56) References Cited

U.S. PATENT DOCUMENTS 5,487,593 A   1/1996   Potts et al.
5,704,766 A   1/1998   Fennel et al.
5,746,487 A   5/1998   Naito et al.
6,095,620 A   8/2000   Dillard et al.
6,188,947 B1  2/2001   Zhan
6,299,260 B1  10/2001  Hachtel

FOREIGN PATENT DOCUMENTS

DE   42 32 132      3/1994
DE   43 32 130      3/1994
DE   198 18 174    11/1999
GB   2 341 949      3/2000
WO   WO 92/17355  10/1992
WO   WO 96/15927   5/1996

Primary Examiner—Christopher P. Schwartz
Assistant Examiner—Melanie Torres
(74) Attorney, Agent, or Firm—Kenyon & Kenyon

(57) ABSTRACT

The present invention relates to a method and device for driving a brake system pump motor, which has the advantage of simultaneously allowing prioritized, individual braking strategies, using the present invention as a subsystem for intelligently driving the pump motor. The invention provides the additional advantage of reducing pump motor current requirements, allowing the use of a reduced size of pump motor. The invention provides for a predetermined period of full-on voltage at the initiation of a braking request, subsequent periods of variable pump motor voltage on-time, depending on pulse width modulation of a drive motor signal based on a comparison between the motor voltage and a threshold voltage, and subsequent periods of full-on voltage for a predetermined period based on a comparison between the motor voltage and a safety threshold voltage.

8 Claims, 6 Drawing Sheets

METHOD AND DEVICE FOR CONTROLLING A PUMP OF A BRAKE SYSTEM

This is a continuation of application Ser. No. 09/552,867 filed Apr. 20,2000 now U.S. Pat. No. 6,499,813

BACKGROUND INFORMATION

The present invention relates to a method and device for controlling a pump of a brake system, such as in an anti-skid control system, a friction control system, or a vehicle dynamics control system according to the preambles of the independent claims.

German Patent Application 42 32 130 A1 describes a method and a device for controlling an electric motor-driven hydraulic pump that is used to generate the servo pressure of a brake system with anti-skid control and/or traction control. For this purpose, it is driven with a variable drive cycle composed of a pulse/pause sequence. The voltage regeneratively induced by the pump motor in the interpulse pauses is evaluated as a measure of pump speed. The computed difference between this generator voltage as an actual speed quantity and a setpoint quantity for the pump motor speed formed in an anti-skid control or traction control system provides a differential quantity to a downstream controller. The pulse width-modulated actuating signal for driving the pump is formed with the output signal from the controller. The drive motor of the hydraulic pump is turned on and off with the clock pulse of this pulse width-modulated actuating signal.

It has been shown that the known method and corresponding device are unable to provide optimum results in every respect. The object of the present invention is therefore to provide an optimized method that can also offer the driver a comfortable pedal sensation independently of the setpoint quantity formation, at the same time providing a simple control structure.

To this end, German Patent No. 198 18 174, which is not a prior publication, shows a method for controlling a pump of a brake system, in which a pump is initially connected to the voltage supply for a specifiable period of time, in response to a pumping request in a brake system. Subsequently, the pump then receives at least one control signal, which is constant for at least one time interval and is formed from the sum of the pulse duration and interpulse period. In this drive cycle, a drive pulse for switching the pump on again is generated based on a comparison of a motor voltage to threshold voltage values. Consequently, the starting pulse for the pump is not generated until a load occurs, which is characterized by the motor voltage reaching a threshold voltage value. Preventive recognition of a load situation and intensified driving of the pump resulting from this, are not shown. In addition, this document only starts with an arbitrary control algorithm or a feedback control. The use and coordination of several simultaneously active feedback controls acting on the pump is not shown.

This object as well as additional improvements are achieved according to the independent claims, with the method according to the present invention as well as the corresponding device.

ADVANTAGES OF THE INVENTION

Initially, the pump is not clocked and is driven at full load for a selected time TAnstMax, i.e., full supply voltage Ubat, in particular, is applied to the pump, driving the latter with a clocked PWM signal that is derived from a direct comparison between motor voltage UM, which drops across the pump motor, and at least one selected voltage threshold value Us. For safety reasons, a minimum on-time TPeinMin=TTakt−TPausMax of the pump can be maintained within a drive cycle by a predetermined maximum off-time TPausMax. Also due to safety considerations, the pump is driven at full load upon reaching a minimum voltage threshold Uss, i.e., supply voltage Ubat, in particular, is applied to the pump motor for a certain period of time. By using motor voltage UM in a direct comparison with different voltage threshold values, the method can be used independently of the controller concept.

The method according to the present invention and the device having the independent features of the claims, have the advantage that not only is the equipment and methodological design simple, but they can be used independently of the brake logic (e.g., anti-skid control/traction control/ vehicle dynamics control system). In addition, the forced pumping action of the pump during drive cycle period TTakt produces a defined pedal sensation. This continuous availability of the active pressure variation in the brake circuit, due to minimum pump on-time TPeinMin, is also secondarily relevant to safety. Defined minimum pump on-time TPeinMin per clock cycle TTakt avoids what may be a large difference between the existing pressure and the pressure needed in the brake circuit, e.g., when a sudden pumping request is received from the brake system. This makes it possible to maintain a low average speed of the pump motor, since the pump is additionally fully driven when subjected to a heavy load, and consequently upon meeting certain conditions, in particular when motor voltage UM reaches a selectable safety threshold voltage Uss. Using a variable number of threshold values and different clock cycle times and/or driving times assigned to them makes it possible to adapt the system to any braking situation. The variable pump on- and off-times advantageously make it possible to reduce the pump motor speed without sacrificing performance.

It is also advantageous for the pump motor voltage to drop to a value that is less than a further threshold voltage during normal clocking operation, in which case this further threshold value can also correspond to safety threshold Uss or another threshold voltage Us, thus reactivating the pump for the rest of the cycle, additionally increasing availability.

If pump motor voltage UM drops to a value that is smaller than, for example, safety threshold value Uss directly after the pump is turned off, i.e., during the next cycle, the pump is reactivated for a selectable period of time. By allowing pump motor voltage UM to drop immediately after deactivation reveals that the pump is under heavy load during this phase. Consequently, the pump can be driven during this phase for a time that is much longer than the drive cycle period. This critical threshold, e.g., Uss, can be used to simultaneously prevent the pump motor from remaining at a standstill.

According to one advantageous embodiment, the method for driving the pump motor is designed so that the pump driving action according to one control strategy, e.g., traction control, is independent of the pump driving action according to another control strategy, such as anti-skid control. This can be accomplished by using different parameters and different logic components for the control systems. Each control strategy, i.e., each control system—such as anti-skid control or traction control—can intervene in pump motor clocking at any time, depending on certain input, e.g., using a flag. A priority control system can also avoid additional pump driving conflicts. This enables intervention to be made in the pump motor clocking at any time so that the pump is switched between continuous and full drive. This makes it possible to provide a modular pump motor drive mechanism that uses only one algorithm or only one basic logic. In this module, independent pump motor clocking of the individual systems i.e., control arrangements influencing the braking action can be operated simultaneously to ensure vehicle driving stability and/or safety.

Further advantages lie in reducing the pump motor current and consequently in dimensioning the pump motor, since it needs to be driven continuously only for a short period of time. The duration of full drive can be limited by estimated wheel break pressures, especially when decreasing from a high wheel pressure level.

A pump motor module can also be provided with an additional input for a flag. Controlled, for example, by the traction control algorithm, this flag can be used to immediately disable clocking of the pump driving action, e.g., by the anti-skid control system, and the pump can be driven in a different mode. The same also applies, of course, to all systems i.e., control arrangements influencing the braking action to provide vehicle driving stability and/or safety.

With the embodiments described above and the conditions selected therein, the pump can be driven selectively and optimized to its requirements and the current operating mode.

Further advantages are the object of the claims and the description

DRAWINGS

One embodiment of the present invention is illustrated in the drawing and explained in greater detail in the description below.

DESCRIPTION OF EMBODIMENTS

Figure 1:
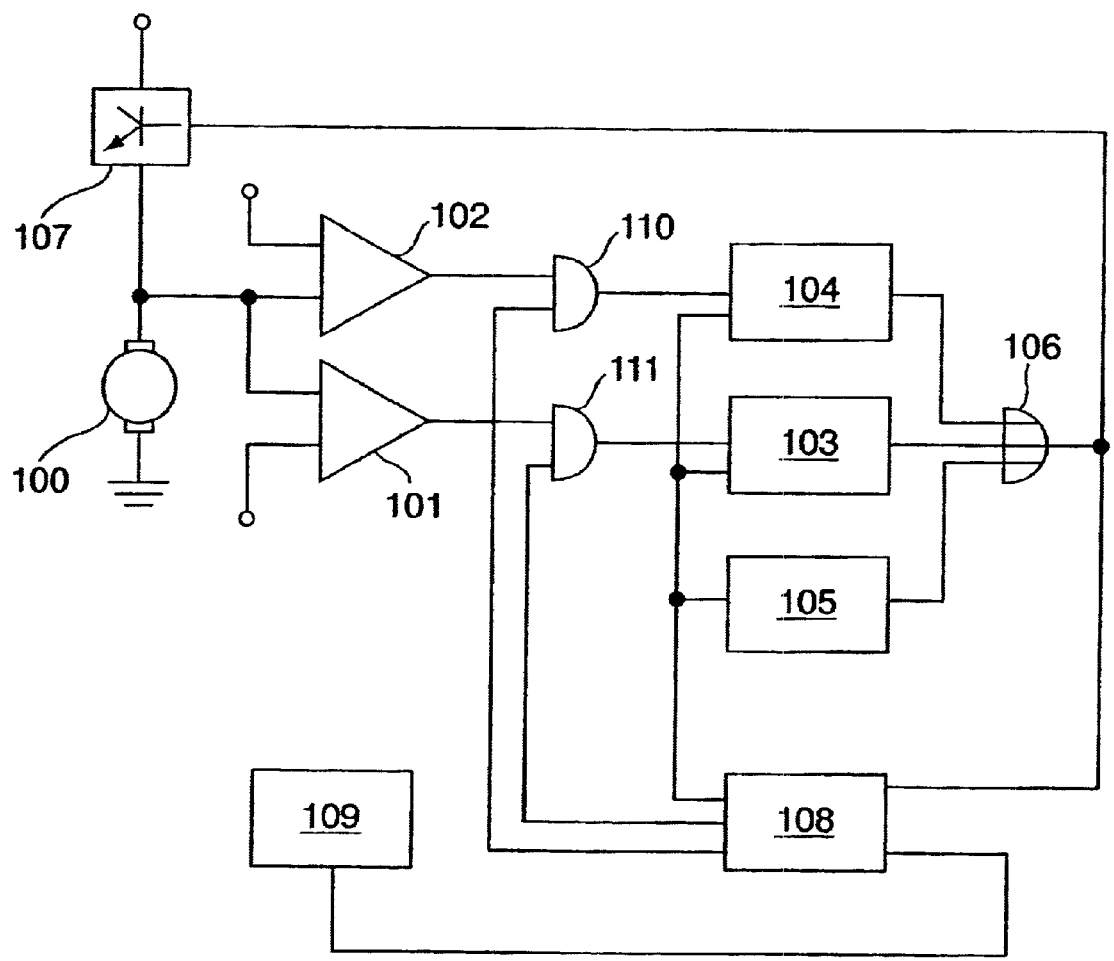
FIG. 1 shows a block diagram of a drive circuit.
Figure 2A:
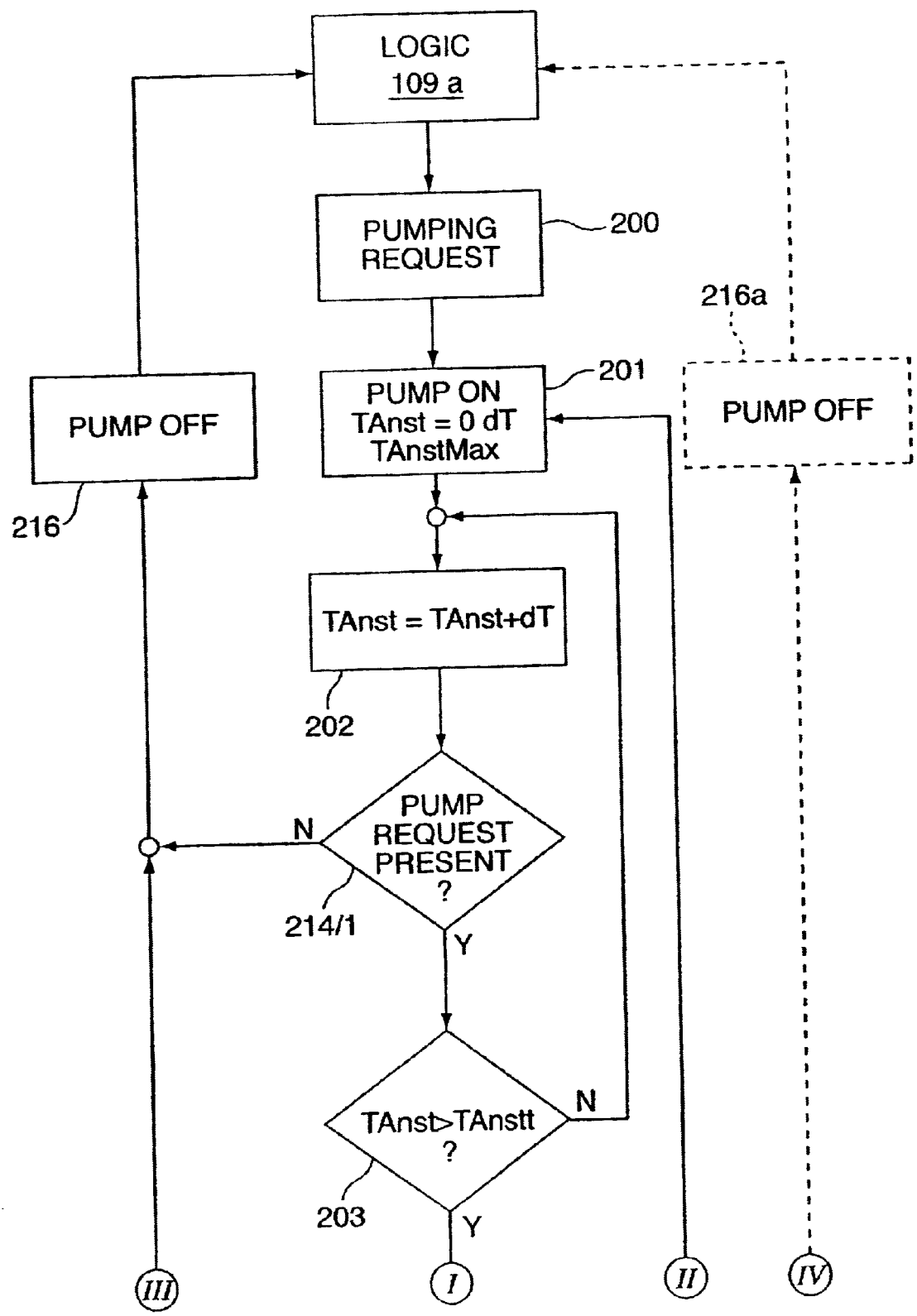
FIG. 2 shows a flow chart illustrating a possible pump drive sequence.
Figure 2B:
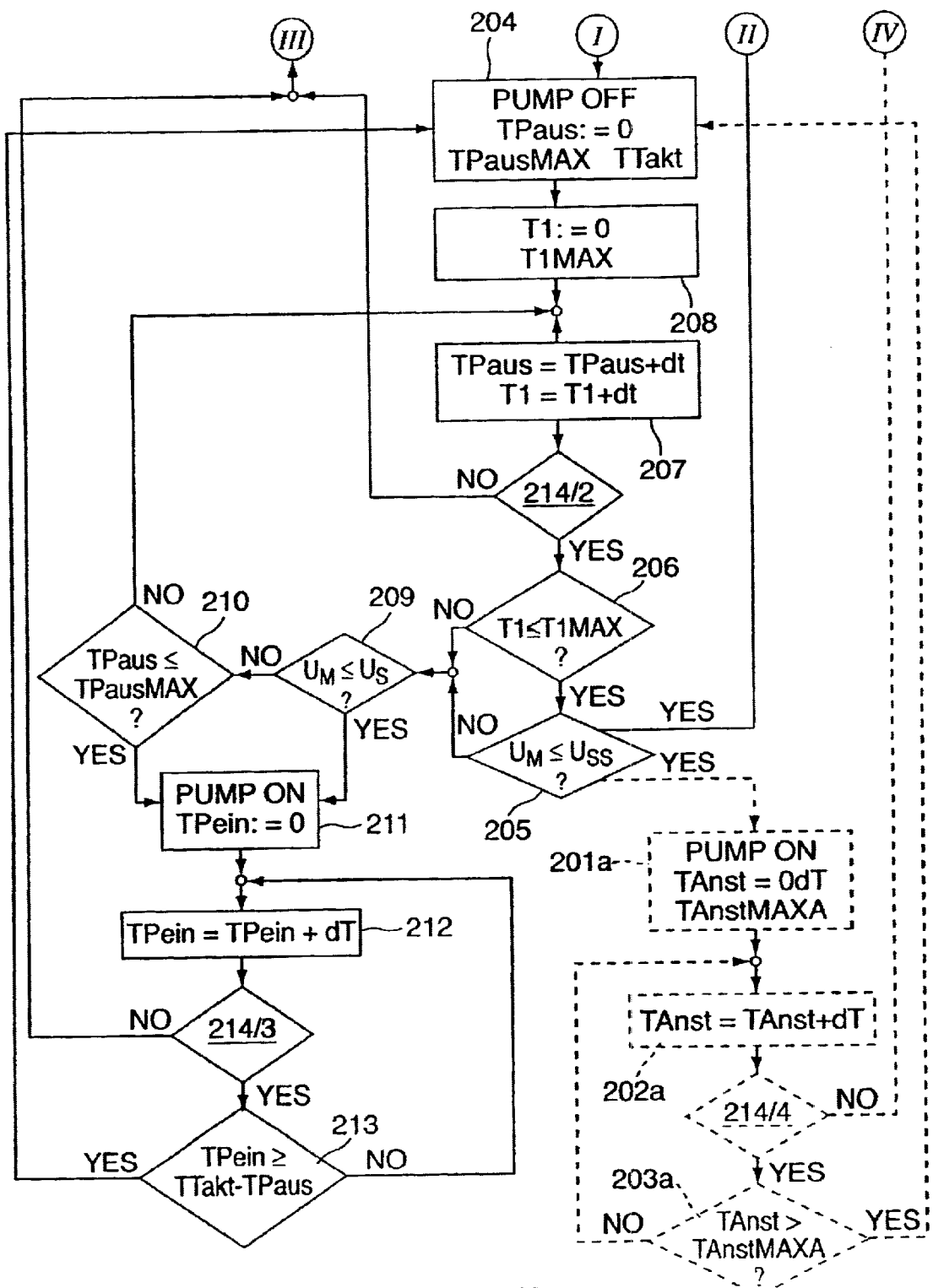
Figure 3:
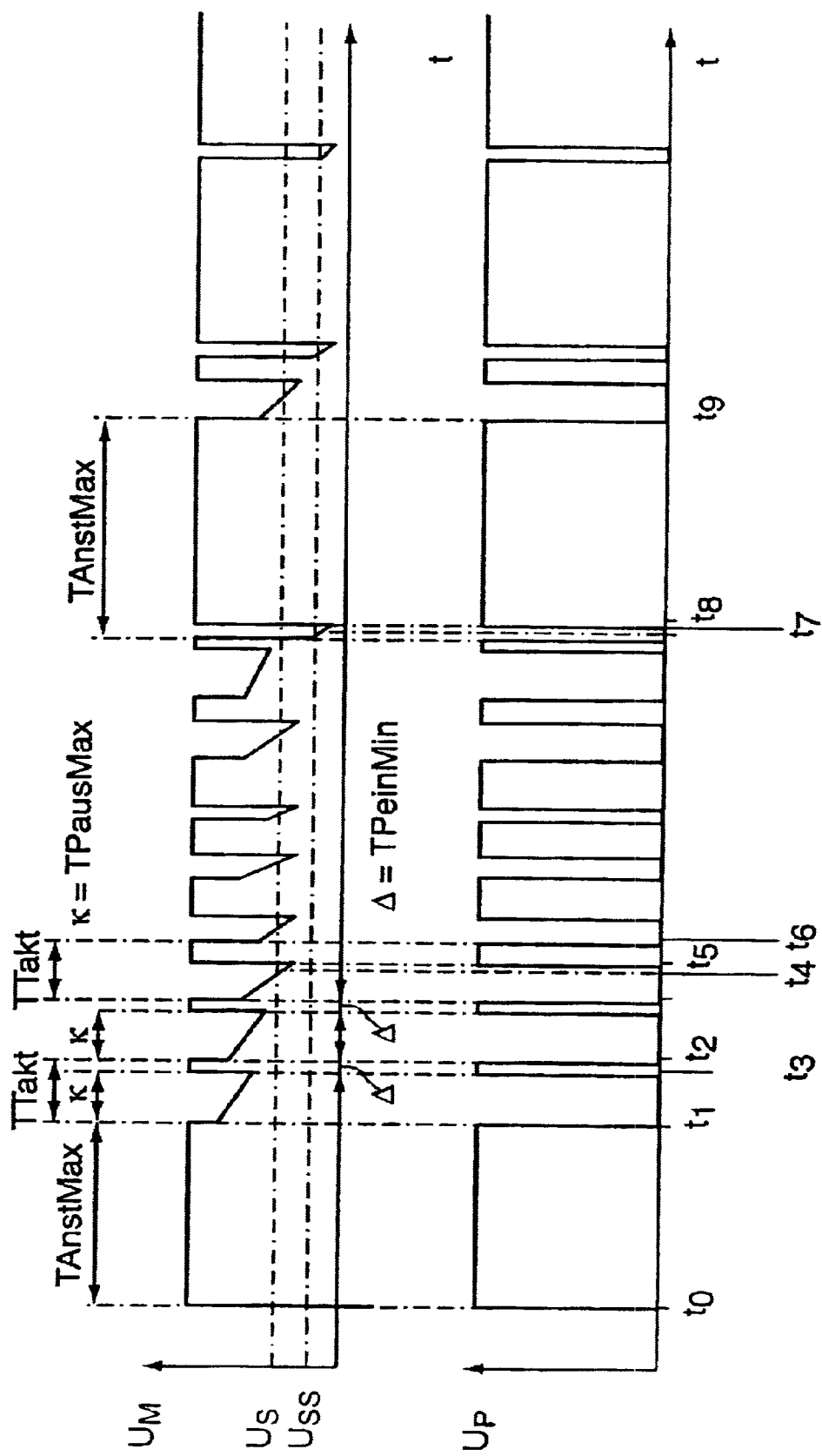
FIG. 3 shows signals of motor voltage UM and drive signal UP.

FIG. 1 and FIG. 2 show the ways in which the desired variation in the control signal of the pump illustrated in FIG. 3 can be produced according to the present invention. Motor voltage UM of the pump motor, which is also illustrated in FIG. 3, serves as an input quantity. FIG. 3 does not show negative voltage peaks that generally occur in motor voltage UM immediately after the pump motor is turned on (for example, see German Patent Application 42 32 130 A1, FIG. 3), since the signal is always evaluated only after these voltage peaks occur. FIG. 1 shows a possible drive circuit, and FIG. 2 shows a possible implementation of a program sequence in a control unit on the basis of a flow chart.

In FIG. 1, a pump motor 100 is connected to a supply voltage Ubat via a switching means 107. On the switching means side of the pump motor, a connection is established to two comparison means 101, 102. Furthermore, one comparison means 102 is connected to a line over which a voltage value Uss is supplied to comparison means 102 Likewise, a second comparison means 101 is connected to a line over which a second voltage value Us is supplied to comparison means 101. The output of comparison means 102 is connected to an AND gate 110, and the output of comparison 101 is connected to an AND gate 111. From controller 108, a line leads to AND gate 110 and a second line to AND gate 111. The output of AND gate 110 is connected to a holding element 104. The output of AND gate 111 is connected to a holding element 103. A synchronization line also leads from a controller 108 to holding elements 103 and 104. This synchronization line is also connected to a pulse generator 105. The outputs of holding elements 103, 104 and pulse generator 105 are connected to an OR gate 106. The output of this OR gate 106 leads to switching means 107 and controls the latter. Switching means 107 connects and disconnects pump motor 100 to and from a supply voltage Ubat. The output of OR gate 106 additionally leads to controller 108. The pumping request is transmitted to controller 108 from a superordinate logic, e.g., from a anti-skid control system, traction control system, or vehicle dynamics control system, via a line 109.

The operation of the circuit arrangement illustrated in FIG. 1 is described below. Voltage UM that is present at the motor of pump 100 of a brake system is tapped and supplied to two comparison means 101, 102.

In addition to using the analog quantities for motor voltage UM, UM must be input and prepared, e.g., for use in a computer program. To use motor voltage UM according to the present invention, the information that it contains is a determining factor and can be used as either analog or digital information.

Motor voltage UM is compared in a comparison means 101 to a selected fixed threshold voltage Us that is dependent, for example, on the vehicle type and/or brake system (arrangement, brake fluid volume, etc.). Likewise, motor voltage UM is compared in a second comparison means 102 to a lower, but also fixed safety threshold Uss. The result of the comparison in comparison means 102, however, is evaluated only during a first interval T1Max after the beginning of clock cycle TTakt. To do this, AND gate 110 is enabled by controller 108 only for this first interval T1Max. During this first interval T1Max of clocking operation, a check is also carried out to see whether UM drops below threshold voltage Us, after which gate 111 is also switched through. During subsequent sampling intervals dT of a clock cycle TTakt, i.e., after T1Max, controller 108 enables only second AND gate 111. During first interval T1Max, therefore, the signals from comparison means 101 and 102 are switched to holding elements 103 and 104. When motor voltage UM reaches safety threshold Uss during first interval T1Max, the signal produced by this comparison in comparison means 102 is switched to OR gate 106 in holding element 104 for period of time TAnstMax. This sets switching means 107 to the switching position in which it connects pump motor 100 to supply voltage Ubat for period TAnstMax. The pump is thus driven at full load for period TAnstMax, which prevents the pump from being turned off at the end of the cycle. If UM does not reach Uss, but only threshold voltage Us, during first interval T1Max of the clocking operation, pump motor 100 remains connected to the voltage until the end of clock cycle TTakt after the comparison result is switched from comparison means 101 to holding element 103. Holding element 103 thus switches this comparison result to OR gate 106 before the end of drive cycle TTakt. Switching means 107 is therefore set to the switching position in which it connects pump motor 100 to supply voltage Ubat for period TPein= TTakt−TPaus. Within a clock cycle TTakt, TPaus is the pump off-period which, in this case, ends when motor voltage UM reaches threshold voltage Us. Holding elements 103, 104, can, for example, be implemented by flip-flops, sampling and holding elements, etc. or by programming equivalents (see FIG. 2). A particularly important consideration in this regard is the fact that only the signal that is switched from comparison means 101, 102 to elements 103, 104 via gates 110, 111 when motor voltage UM reaches threshold Us or Uss is maintained for desired period TAnstMax or TPein, thus connecting pump motor 100 to supply voltage Ubat for these periods of time. If threshold value Us or Uss is not reached, the resulting comparison signal is not maintained for selected time TAnstMax or TPein. Together with the two signals from holding elements 103 and 104, a third signal is supplied from a pulse generator 105 with an interpulse pause TPausMax to OR gate 106. In this connection, the pulse can also be generated by a frequency generator or similar device. Selected maximum pump off-time TPausMax begins with drive cycle TTakt and ends before the end of this cycle. After time TPausMax, the pulse generator switches a drive pulse to switching means 107 via OR gate 106, maintaining this pulse until the end of drive cycle TTakt. This places switching means 107 into the switching position in which it connects pump motor 100 to supply voltage Ubat for period TPeinMin=TTakt−TPausMax. This provides a minimum on-time TPeinMin of pump motor 100 per drive cycle TTakt. The signal resulting from OR gate 106 then controls switching means 107, which alternately establishes and interrupts the connection between supply voltage Ubat and pump motor 100. Both holding elements 103, 104 and pulse generator 105 have starting times that are synchronized with the beginning of drive cycle TTakt, which coincides with the pump turn-off time. Controller 108 is used to provide full pump drive for TAnstMax at the beginning of control, to enable comparison means 101, 102 by enabling corresponding AND gates 110, 111, and to synchronize elements 103, 104, 105 connected upstream from OR gate 106 with the drive cycle. The input quantities received by controller 108 include the signal from OR gate 106, which also controls switching means 107. Because of this, controller 108 knows when pump motor 100 is disconnected from supply voltage Ubat. This makes it possible to initiate drive cycle TTakt after pump motor 100 is disconnected from Ubat, e.g., after a full drive phase for TAnstMax. It is also conceivable to provide a counter in the controller instead of or together with this input signal, with this counter being used to determine the pump turn-off time after full drive has been achieved. When the pump is at a standstill, the starting time for driving the pump is a pump request, which also serves as the input signal for controller 108 and comes from superordinate controller logic 109 (e.g., anti-skid control/traction control/vehicle dynamics control system).

FIG. 2 contains a flow chart illustrating the pump drive sequence in this particular embodiment.

In this case, the function of the drive circuit illustrated in FIG. 1 is implemented by a programming equivalent, e.g., in a control unit. In blocks 201, 211, 266, 216a, and 204 of the flow chart, Pump ON and Pump OFF represent the alternate connection and disconnection of pump motor 100 to and from supply voltage Ubat by an approximate switching means. The starting point is a pump request 200 from a superordinate logic for building up pressure at the discharge end and decreasing pressure at the intake end, respectively. This program request 200 can be the result of a detected wheel instability in the case of anti-skid control or traction control as well as a detected vehicle instability in the case of vehicle dynamics control and is signaled by a corresponding logic 109a. Pump request 200 thus establishes beginning of control 201 at which point a counter for recording the time of full drive TAnst is reset. Full drive duration TAnstMax is also defined in 201. The counter is then incremented 202 at intervals of sampling time dT, and the time condition for the maximum period of full drive TAnstMax is checked 203. Blocks 202 and 203 in the flow chart correspond to the function of holding element 104 in FIG. 1. After each sampling step, a check is carried out in block 214/1 to see whether the pump request from block 200 is still present or not. If the pump request is no longer present, the driving operation is canceled and the pump turned off 216. This state is signaled to superordinate logic 109a. Brief spurious signals do not cause the system to cycle through the entire driving sequence. This functionality is exactly the same in blocks 214/1, 214/2, 214/3, and 214/4, the only difference being that these blocks are positioned elsewhere in the flow chart in FIG. 2. If the pump request is still active, the pump receives full drive during the first cycle. At the end of full drive time TAnstMax, the pump is disconnected from power supply 204. This is the starting point for drive cycle TTakt in the program and the synchronization time for holding elements 102, 104 as well as pulse generator 105 in FIG. 1. In the drive circuit illustrated in FIG. 1, the pump can be turned on at beginning of control 201 by switching the comparison result from comparison means 102 via gate 110, since pump motor 100 has not yet started up at this point, which means that motor voltage UM is still below safety threshold Uss. In block 204 of FIG. 2, the counter variable for off-time TPaus of pump motor 100 is now reset, and drive cycle TTakt and maximum pump off-time TPausMax are defined per drive cycle. The duration of drive cycle TTakt thus begins for the first time when pump motor 100 is disconnected from supply voltage Ubat. Based on this initialization step 204, which is performed by controller 108 in FIG. 1, pump motor off-time TPaus as well as the period of first interval T1 are incremented by adding up sampling intervals dT in 207. A check to determine whether the drop in input motor voltage UM has caused the latter to reach safety threshold Uss is carried out in 205 only within first interval T1Max after pump motor 100 has been disconnected from supply voltage Ubat. To do this, maximum length T1Max of interval T1 is defined in block 208 prior to the first loop of the clocked driving action, and counter variable T1 is reset for the interval. A check is carried out in block 206 to determine whether the sequence is in first interval T1 and thus whether a query 205 should be made to see whether threshold Uss has been reached. After all, if motor voltage UM reaches safety threshold Uss during first interval T1Max, pump motor 100 requires full drive according to the present invention, as required at the beginning of control 201, 202, 203, and pump motor 100 must be connected to supply voltage Ubat for period TAnstMax. Alternatively, a driving time TAnstMaxA that differs from TAnstMax, as shown by the area in FIG. 2 marked by dashed lines (201a, 202a, 203, 214/4, 216a), can be set for pump drive after UM reaches Uss. If UM does not reach Uss, a check 209 of whether voltage threshold Us is reached is carried out, which corresponds to the signal sequence via comparison means 101 and gate 111 in FIG. 1; in addition a check 210 is carried out to see whether TPaus has reached maximum pump off-time TPausMax. This guarantees minimum pump on-time TPeinMin=TTakt−TPausMax. This function is performed by pulse generator 105 in FIG. 1. If UM has not reached either threshold Us or maximum off-time TPausMax, the pump motor remains disconnected from supply voltage Ubat. If one of conditions 209, 210 is met, switching means 107 restores supply voltage Ubat of the pump motor in step 211. At the same time, a counter variable TPein is initialized, which can serve as a measure of the pump on-time, step 211. On-time TPein is counted in a counter at sampling intervals dT, step 212, which corresponds to the function of holding element 103 in FIG. 1. According to the present invention, pump on-time TPein, combined with off-time TPaus should not exceed clock cycle duration TTakt despite guaranteed minimum on-time TPeinMin if the pump is driven by clocking. At the moment when clock cycle time TTakt is achieved by the addition of TPein and Tpaus, step 213, The hydraulic pump is again disconnected from supply voltage Ubat. A PWM signal, which has the advantage of reduced noise development and also ensures greater reliability through the minimum on-time per clock cycle, is thus easily generated in the clocked drive phase.

FIG. 3 now shows the resulting variation of motor voltage UM and pump drive signal UP, produced by OR gate 106 in FIG. 1. At beginning of control t0 (201), i.e., after a pump request 200 from superordinate logic 109 and 109a, respectively, full drive is achieved for duration TAnstMax (t1–t0). Full dive duration TAnstMax is permanently selected on the basis of measured variables as a function, for example, of the vehicle type and/or the brake system used. The full drive phase ends at the time the pump is turned off 204 following TAnstMax at t1. The pump is then driven with selectable clock cycle TTakt (t2–t1) because, after the full drive phase, the full pump motor output is not necessary. If motor voltage UM reaches threshold Us t4 (209), the pump is reactivated from next sampling time t5 to the end of clock cycle TTakt at t6 (211, 212, 213). Time difference t5–t4 between determining that threshold value Us has been reached and activation of pump motor 100 is produced by sampling time dT used. If a hydraulic brake system now delivers brake fluid against a high pressure in the brake circuit, motor voltage UM drops more quickly. If, however, brake fluid is delivered against a lower pressure, motor voltage UM decreases more slowly. Different turn-on times 211 of pump motor 100, produced by comparing the drop in motor voltage UM (which takes place at different speeds) to selected voltage threshold Us, yield variations in on-durations TPein, thus modulating the pulse width of drive signal UP. If, however, motor voltage UM does not reach threshold Us (209), the pump remains on until the end of drive cycle TTakt t2 after expiration of the maximum pump motor off-time TPausMax t3–t1 (210). This yields minimum pump motor on-time TPein t2–t3 per drive cycle TTakt t2–t1. If motor voltage UM reaches safety threshold Uss T7 (205) directly after pump motor 100 is turned off, i.e., within first interval T1Max (208, 206), full drive t8 (201, 202, 203) is achieved for TAnstMax just like at beginning of control 201 t0. This guarantees that the pump will achieve the necessary delivery rate under high load, such as negative μ-deviation, poor delivery path, or a high admission pressure. Alternatively, a time TAnstMaxA, which differs from TAnstMax, can be used, as illustrated in the portion of FIG. 2 marked by dotted lines. Time difference t8–t7 is again determined by sampling time dT. At the end of TAnstMax t9, pump motor 100 is again disconnected from supply voltage Ubat 204.

According to a further advantageous arrangement of the embodiment, various selected fixed periods TAnstMax and TAnstMaxA, respectively, are used for full drive at the beginning of control 201 TanstMax (t0, FIG. 3), as well as for full drive upon reaching safety threshold Uss (t8, FIG. 3, e.g., TAnstMaxA). In addition, it can be useful to vary the setting of full drive duration TAnstMax, based on certain values, e.g., the pressure conditions in the break circuit, the pump motor speed, motor voltage UM, supply voltage Ubat, etc. The use of different periods for full drive is shown in the section of FIG. 2 marked by dashed lines. In this case, a time TAnstMax that differs from TAnstMax is used in blocks 201a, 202a, and 203a. the functions of the individual blocks in the portion of FIG. 2 marked by dashed lines (201a, 202a, 203a) are identical to blocks 201, 202, and 203 in FIG. 2, except for the use of TAnstMaxA. Like in 214/1, a check is carried out in block 214/4 to determine whether the pumping request is still present. If not, the pump is turned off in block 216a and the event signaled to logic 109a.

Instead of selecting fixed threshold values Us, Uss used in the embodiment, it would also be suitable, for example, to input variable values during the control operation, e.g., as a function of the pressure conditions in the brake circuit, the pump motor speed,. motor voltage UM, supply voltage Ubat, etc. In addition, the number of different threshold values used does not have to be limited to two. It is conceivable to use more than two or even only one threshold value, depending on the application.

In the case of a clocked driving action, it would also be advantageous to set this driving action not only to the single clock cycle TTakt used here. In a further embodiment, it would be advantageous to vary the clock cycle individually for each pumping request 200 in block 204 of the flow chart shown in FIG. 2, possibly as a function of certain parameters. The different clock cycles could even be assigned different threshold values.

According to the embodiment, beginning of control 201 takes place as a response to pumping request 200 from the superordinate logic. In the embodiment, for example, an anti-skid control system, friction control system, and vehicle dynamics control system are used for this purpose. Other control systems are also conceivable. In an adaptive cruise control (ACC) system, for example, a pumping request 200 does not have to result in an intervention in the brake system. A situation in which the vehicle is in danger of running into the vehicle just ahead, and thus a fully intentional deceleration of the driver's own vehicle, triggers a pumping request 200. A pumping request 200, and thus beginning of control 201, is therefore triggered by any desired change in pressure in the brake circuit, regardless of the control system used.

According to a further preferred configuration of the embodiment, FIG. 4 also shows the above-mentioned refinements and improvements. The flow chart shown in FIG. 4 can be implemented entirely or partially by hardware; in addition, the illustrated flow chart can run on one or more control units in the form of a program. Based on at least one superordinate logic, illustrated schematically by block 401, for example an anti-skid control system, a traction control system, or a vehicle dynamics control system. The illustrated methods can also be used in any system or control arrangement influencing the braking action to increase vehicle driving stability and/or safety. Superordinate logic 400 provides quantities and variables for the subsequent sequence by default settings, initialization, and/or calculation. These can include off-times for TPaus, various possible durations for TTakt, different voltage thresholds for Us1 and Us2, safety slow-down times for Tsn1-and Tsn2, respectively, values for time thresholds Ts1, Ts2, TAnstMax, Ts, etc., time segments such as for dT1, and initial values, such as for TPstart. These values can be derived, for example, from estimates i.e., model calculations, control- or system-specific settings or performance data i.e., tables. Likewise, flags, i.e., identifying markers, can also be set and/or reset in the at least one superordinate logic, which is illustrated schematically as block 400, provided that this does not take place directly in the method itself. Furthermore, a pumping request for a control operation, in this case R1, R2, to initiate the process sequence, can also take place in block 400.

The process sequence begins in Field 401. Query 402 first performs a check to see whether a control system, i.e., control strategy, is even active. This check can be carried out, for example with the help of flags, i.e., identifying markers, e.g., in the form or bits or bytes. It is therefore conceivable for a system influencing the braking action, i.e., a control arrangement of this type for increasing vehicle driving stability and/or safety, to set such a flag, or to cause such a flag to be set, at the time this system is activated. Query 402 can also check whether a pump request from one of control systems R1 or R2 is present, which can also be indicated by setting flags. Thus, a flag F1P can show that control system R1 (traction control in this case) has just issued a pumping request, while a flag F2P can be used in the same manner for control system R2.

By way of example, flags that are or have been set as a function of certain conditions are used in part in queries in the description below.

Of all the systems, i.e., control arrangements, influencing the braking action to increase vehicle driving stability and/or safety, two systems, R1 and R2, are used in this embodiment by way of example. This number can also obviously be increased to more than two control systems, i.e., control strategies, and the use of only one strategy is also possible. For example, a traction control system is used for control system, i.e., control strategy R1, while a anti-skid control system is used for control strategy, i.e., control system R2.

Query 402 thus checks whether flag F1 is set for the traction control system or flag 2 for the anti-skid control system, with these flags indicating that at least one control system is active. If not, the sequence moves to the end of the program (441) via block 411. Initialization, default setting or possibly calculation of quantities and/or variables for the next loop pass can be carried out in block 411.

If at least one control system is active, query 403 checks whether both control systems R1 and R2, i.e., traction control and anti-skid control, are active simultaneously, i.e., whether an anti-lock brake system is used. If so, a subsequent query 404 determines which of the control systems, R1 or R2, must be accessing the pump. This is done, for example, using a flag F1P which indicates that control system R1, friction control in this case, has performed a pump motor control operation. If this flag F1P is set, the sequence goes on to query 406. If flag F1P is not set, the sequence goes on to query 405. Query 405 is also reached from query 403 if control systems R1 and R2 are not both active. If an anti-lock brake system is therefore not used, the sequence moves directly to the path beginning with query 405.

If query 403 determines that an anti-lock brake system is not being used, i.e., that control systems R1 and R2 are not active simultaneously, an additional query can conceivably determine which of the two control systems, R1 or R2 (traction control or anti-skid control) is in use. On this basis, the path beginning with query 406 is then selected for traction control or the path beginning with 405 for anti-skid control.

Query 406 performs a check for control system R1, traction control in this case, to see whether a certain minimum drive time, i.e., minimum slow-down time Tsn of the pump, i.e., whether a counter for a minimum driving time of this type, has a value greater than zero, indicating whether it is still present. This minimum slow-down time for control system R1(Tsn1) represents a kind of safety slow-down operation for the pump, for example if the loop pass is interrupted. This counter, i.e., minimum drive time Tsn1, itself is decremented in block 408, i.e., a time segment dT1 is subtracted from Tsn1.

According to a preferred embodiment, time dT1 equals the time for one loop pass in the flow chart, that is a count variable of 1. If the aim is to achieve real-time operation, it is conceivable to perform exactly one loop pass per sampling step dT. In this case, dT wold then equal dT1. Otherwise, dT is less than dT1, i.e., more than one sampling step per loop pass is carried out. This means that any quantity can be set for dT1. This pump safety slow-down with minimum drive time Tsn also applies to control system 2, in this case the anti-skid control system. Identical minimum pump drive time Tsn1 can be selected for safety slow-down, or a time that differs from Tsn1 can be chosen with Tsn2.

Query 405 then also checks whether Tsn2 is greater than zero, which means that minimum pump drive time Tsn2 has not yet ended. If minimum drive time Tsn2, i.e., a counter variable assigned to it, is greater than zero, time segment dT1 is subtracted from minimum drive time Tsn (or Tsn2 in the case of R2, the anti-skid control system), i.e., a counter variable is decremented, in block 407 as well. Otherwise, a time segment dT1 is not subtracted. Furthermore, the conditions that apply to Tsn1 can be also used here.

Following the safety slow-down condition in query 406, the sequence passes through block 408 to query 410. This query determines whether or not full drive, for example identified by a flag Fvoll, should be carried out. This can be done in control system R1 (traction control system), for example, by setting a flag Fvoll1 and checking whether it exists in query 410. Flag Fvoll1 can also be set as early as block 400, before a loop pass begins, due to the superordinate logic. It is therefore possible, depending on certain conditions, to perform full drive as a preventive measure even before a query of a voltage threshold such as Us or Uss. Thus, before a situation of high load on the pump actually occurs, this condition can be predicted as a function of at least one condition and taken into account in advance, and therefore controlled, by increased pump operation, in particular by full drive. Previously, such a situation of high load could be detected and taken into account only when motor voltage UM reached or dropped below a voltage threshold like Uss, i.e., only at the moment the situation occurred.

To provide a preventive evaluation, a distinction can be made between a select high mode (SH) and a select low mode (SL). Generally speaking, select high mode means that the braking action and/or driving stability and/or safety is controlled on the basis of the wheel on an axle where the highest coefficient of friction $\mu$ is detected, and at least the control of the second wheel on the same axle is adjusted accordingly. Select low mode indicates the same thing, but based on the wheel on an axle that demonstrates the lowest coefficient of friction $\mu$.

Conditions that cause Fvoll, in particular Fvoll1, to be set include a one-sided control operation, such as select high mode SH and/or a previously estimated wheel brake pressure RD that exceeds a selectable threshold value of a pressure SD, for example between 60 and 80 bar, in particular a buildup to a high wheel brake pressure level and/or a positive system deviation RA+, etc. This positive system deviation RA+occurs, for example, when a drive slip value of the wheel exceeds a selectable maximum valid slip threshold. Likewise, a tendency of a wheel to lock in an anti-skid control system can also produce a positive system deviation of this type. For example, all three above-mentioned conditions cause the flag, e.g., Fvoll1, to be set when combined into logic operation V1, i.e.,:

$$SH \text{ and } RD{>}SD \text{ and } RA{+} \qquad (V1)$$

Wheel brake pressure RD can be estimated in advance, for example, by evaluating a characteristic curve or a characteristic map, which can be determined in advance by trials and/or simulation of standard situations. An adaptive set of performance data that adjusts continuously during operation and can be used to evaluate the pressure estimate, is advantageous. Another possibility is to use a pressure exerted during the previous loop pass to recursively determine the pressure to be achieved, in particular the wheel brake pressure, during the next loop pass. In addition to this recursive approach to estimating pressure, a previously determined series of pressure drop and pressure rise pulses, respectively, can be used to establish how high the pressure, in particular the wheel brake pressure, is or will be during a specific pressure pulse.

According to the conditions applying to select high mode SH, i.e., select high control, used in V1, one wheel per axle is always being controlled (one-sided control), in particular always only one drive wheel per driven axle. This is indicated, for example, by setting a wheel control memory, i.e., a flag in this memory. In select high mode SH, therefore, traction control always takes place, e.g., adjusting to a high accelerative power in the case of the traction control system or to a short braking distance in the case of an anti-skid control system.

Likewise, useful conditions that set the Fvoll flag, in particular Fvoll1, include a desired pressure drop from a high wheel brake pressure level (e.g., detected by at least one selectable pressure drop threshold SDA exceeded by RD) and/or a two-sided control, in particular a simultaneous pressure drop at two wheels on the same axle, and consequently a select low (SL) or select high mode (SH). In the case of two-sided control, both wheels on the same axle are thus controlled. In terms of the pressure drop thresholds (SDASH, e.g., 40–60 bar; SDASL, e.g., 15–35 bar), it is possible to distinguish between select high mode SH, with a select-high pressure drop threshold SDASH, and select low mode SL with a select-low pressure drop threshold SDASL. If multiple wheels, in particular drive wheels, are controlled (two wheels in standard drive to four wheels in all-wheel drive), for example in select low mode SL, it is also possible to distinguish between each wheel (RD1–RD4) with respect to wheel brake pressure RD. For example, RD1 is the estimated wheel brake pressure on the left side and RD2 the wheel brake pressure on the right side of an axle, in particular a driven axle.

According to another conceivable preventive condition, it is possible to analyze whether a pressure drop module (DABB module) or a pressure rise module (DAUF module) is initialized and is or should be carried out, that is whether a pressure drop pulse series or a pressure rise pulse series is or will become active to control the pump. A pressure module DM of this type, i.e., a DABB or DAUF module, especially in software, is initialized before the actual pump operation. This is indicated by flags DABB and DAUF, respectively, or generally by a flag D. If multiple wheels, especially drive wheels, are being controlled in this case as well, a distinction can again be made between each wheel (DABB1–DABB4, DAUF1–DAUF4). In this case, for example, DABB1 corresponds to an active pressure drop module on the left side of a driven axle and DABB2 an active pressure drop module on the right side.

Other preventive conditions can thus be derived from the description above in the form of logic operations for preventive pump control, for example:

$$RD{>}SD \text{ and } D \qquad (V2)$$

or, specifically in the case of a pressure drop:

$$SH \text{ and } RD{>}SDASH \text{ and } DABB \qquad (V3)$$

and $$SL \text{ and } RD{>}SDASL \text{ and } DABB, \text{ respectively} \qquad (V4)$$

or in the case of a pressure drop in two-sided mode:

$$SL \text{ and } RD1{>}SDASL \text{ and } DABB1 \text{ and } RD2{>}SDASL \text{ and } DABB2 \quad (V5)$$

etc.

With respect to the conditions, select low mode SL, i.e., select low control, is characterized by conditions such as cornering, which result, for example, from the steering position. steering angle and/or a transverse acceleration sensor, and/or a higher velocity range (that is determined, for example, when a selectable velocity threshold value is exceeded, e.g., between 30 and 50 km/h), and/or for the respective drive wheels by setting one wheel control memory per wheel i.e., a flag in each of these memories. Using flags also makes it possible to use only one wheel control memory for all drive wheels. In select low mode, therefore, control is aimed primarily at vehicle stability, for example preventing the vehicle from swerving and this taking into account a lower accelerative power, e.g., in the case of the traction control system, or a larger curve radius in the case of the vehicle dynamics control system or a longer braking distance in the case of the anti-skid system. To rule out errors, select low mode can be assumed as non-select high mode and vice-versa.

This situation, i.e., setting flag Fvoll1, therefore reveals a high load on the pump. This is the case particularly in situations where the pump must reach a very high power output, in particular, its maximum power output, for example when driving with a trailer or under $\mu$-split conditions such as $\mu$-split on an incline approach. This enables control system R1, i.e., the traction control strategy, to intervene in a possible, clocked pump motor drive via this flag Fvoll1 and switch the pump to full drive or continuous drive. Optionally, this would also be possible for control system R2 (anti-skid control) via query 409. Similarly, a flag Fvoll2 can be set in this case, which, when present, activates full drive.

If flag Fvoll1 is set, the sequence moves on to block 415. There the duration of continuous drive or full drive, can be set, e.g., TAnstMax or TAnstMaxA. In addition, the period of time when Fvoll1 is set and reset, respectively, can also be determined through these means. In block 415, therefore, pump off-time TPaus can be set to zero and period TTakt to 1 or dTa. A flag FPTu is reset at the same time. Flag FPTu is set either during the process sequence or by a superordinate logic (see block 400) when a certain selectable period Tu after pump deactivation has passed. As a result of this, a check to determine a voltage threshold value, e.g., Us1, can thus be performed later on only within a selectable period Tu after pump deactivation. If flag Fvoll1 is not set, the sequence moves on to block 414. Here, a time threshold Ts is set to a specific value. This value corresponds to the drive time at the beginning of control, for example, full drive period TAnstMax or TAnstMaxA, just like in the previous embodiment. As mentioned above, a desired full drive period Ts can also be set here as a function of certain conditions that may come from block 400. A TAnstMax1, for example, having full drive time Ts, i.e., a corresponding time threshold, is defined in this embodiment.

This definition is also possible as an option in block 413 for control system R2 i.e., the anti-skid control system. A further situation-dependent value TAnstMax 2 adjusted to the specific control system can be used for time threshold Ts in this case.

Also similarly to block 415 of control system R1 pump off-time TPaus can be set to zero for full drive and period duration TTakt, for example, can be set to dT1, for a control system R2 in block 412. Likewise, a flag FPTu can conceivably be set. Query 409 and blocks 412 and 413 are optional and can also be omitted, for example, for control system R2 such as an anti-skid control system.

Blocks 412 to 415 lead to query 416. This query carries out a check to see whether the time threshold preset in 413 or 414 has been reached in the form of full drive time Ts, i.e., whether a pump start time TPstart is less than or equal to selectable time threshold Ts. If time threshold Ts has not yet been reached, start time TPstart is incremented by one time segment dT1 in block 418. If a counter is used for start time TPstart, the start time can be incremented by 1. The remarks made above apply. In addition, period duration TTakt is also set to a time segment dT1, i.e., a loop pass, in block 418. Following block 418, the pump is activated in block 439. A general full drive is therefore ensured at the beginning of control with the query in block 416 and the subsequent activation in block 439 if time threshold Ts is not reached.

If, however, pump start time TPstart does reach or exceed time threshold Ts, the sequence moves on to query 417. This query checks whether selected period duration TTakt from either block 400 or in blocks 412 and 415 has expired, for example by querying whether this time is equal to zero. If so, the sequence moves on to block 420, thus initiating a clocking operation. Period duration TTakt and off-time TPaus can be selected again in block 420. This setting can be made on the basis of calculations or estimates, i.e., pre-definitions, in superordinate logic 400, or varied as a function of sampled values depending on the situation. Selecting TTakt and TPaus also enables the pump on-time to be set with TTakt−TPaus=TPein, i.e., two of time quantities TTakt, TPaus, TPein generally determine the third one. The quantities that can be set are selectable.

If query 417 determines that period TTakt has not yet terminated, the sequence moves on to query 419. This query checks whether the sequence is located within a short, selectable period of time Tu after pump deactivation. As mentioned above, this is done using flag FPTu. If flag FPTu is set, the sequence moves on to block 425 and is thus located within short selectable period of time Tu. If flag FPTu is not set, the sequence goes directly to query 432. This ensures that a first query of a voltage threshold value Us1 can take place only within short period of time Tu after pump deactivation. If set flag FPTu indicates that the sequence is within a short selectable period of time Tu after pump deactivation, a voltage threshold value Us1 is determined, i.e., assigned, in block 425. This voltage value can be either fixed or variable for each loop pass, as defined, for example by superordinate logic 400. Set flag FPTu is simultaneously reset in block 425.

The sequence then moves on to query 426, which is comparable to query 403. This query again checks whether both control systems, i.e., control strategies R1 and R2 in our example traction control and anti-skid control, are active, i.e., whether an anti-lock brake system is present. If so, the sequence moves on to query 427, which, like query 404, now checks which control system, i.e., control strategy, is currently driving the pump motor. This can also be done, for example, with the help of a flag, e.g., with a flag F1P being set when control system R1 (traction control in this case) is driving the pump motor. If this is the case, a new voltage threshold value for Us1 can be defined in block 429. This threshold value can now be either defined either as a fixed value, specifically for control system R1 or variable for each loop pass. Either can be specified by superordinate logic 400. If query 426 does not apply to a complete system composed of controller 1 and controller 2, the sequence moves from block 429 to query 430. Query 430 now interrogates voltage threshold value Us1, which is defined either by a value from block 425 or a value from block 429. Both values can be identical or be specific to the respective control strategies, and therefore different. A comparison of motor voltage UM and voltage threshold value Us1 now makes it possible to determine whether the pump needs to be turned on. Designation Us1 for the voltage threshold value is arbitrarily selected; threshold value Us or Uss could also be used in this case, based on the previous embodiment. This generally applies to the designation of the voltage threshold value.

If motor voltage UM is not higher than threshold value Us1, or if it is equal to the latter, i.e., if it drops below threshold value Us1, the sequence moves on to block 431. Here time TPstart, i.e., a counter corresponding to this time, is reset to zero, i.e., to an initial value. This ensures that the pump motor receives full drive on the basis of query 416, which recurs in the next loop pass. This full drive is maintained during the further loop passes until time threshold Ts is reached in query 416, and TPstart is incremented in block 418. Because Ts can be selected in each loop pass using block 413 or 414, and the initial value for TPstart can be selected in block 400, 411 or 431, a very specific drive period for full drive can be set. From block 432, the sequence returns to block 439, where the pump is turned on, i.e., the pump motor is connected to the power supply. It is also conceivable for full supply voltage Ubat not to be automatically applied to the pump in block 439, but to set the voltage applied to the pump motor according to the needs of the situations or comparable conditions as a function of the control system (R1 or R2).

As mentioned above, the second path from query 417, i.e., when period duration TTakt has expired, leads via block 420, where period duration TTakt and off-time TPaus can be selected once again. Period duration TTakt is decremented at the end of a pass, i.e., in blocks 439 and 440. As mentioned in connection with decrementing minimum slow-down time Tsn1 and Tsn2, respectively, either a time segment dT1 or one loop pass is subtracted. Like with the remaining quantities, for example Us1, Ts, etc., period duration TTakt and off-time TPaus can also be permanently selected or varied according to the loop pass in the block concerned, for example by superordinate logic 400.

The sequence moves from block 420 to query 421, where a check is carried out (like in query 403 or query 426) to see whether or not a complete system is present, in our example, therefore, an anti-lock brake system. If so, the sequence moves on to query 422, which, like in query 427 and 404, respectively, determines whether control system R1 is currently driving the pump motor, which is indicated, for example, by a set flag F1P, as mentioned above. If this is the case, the sequence moves on to block 424, where another situation-dependent and control system-specific definition of period duration TTakt and off-time TPaus can be set for this branch of the clocking operation. Likewise, flag FPTu, which indicates that the end of clocking, i.e., the end of the period, has been reached is also set in block 424.

If a complete anti-lock brake system composed of R1 and R2 is not present, the sequence moves from query 421 to query 432, just like from block 424. Query 432 is also reached from query 430 if the latter determines that motor voltage UM has not dropped below reference threshold Us1. Query 432 then checks whether pump off-time TPaus has not yet been reached. This can occur, for example, by checking to see whether TPaus, or a corresponding counter, is or is not equal to zero. If the counter or time TPaus is not equal to zero, the pump off-time has been reached and the sequence returns to block 439 to activate the pump. If, however, TPaus is equal to zero, i.e., preset off-time TPaus has not yet been reached, the sequence moves on to block 433. Here, off time Tpaus, i.e., a corresponding counter, is decremented. This is done, for example, either by decrementing or subtracting above-mentioned time unit dT1 per loop pass. In addition, a threshold value Us2 can be again selected in block 433. This value can be equal to or different from previous Us1. In this case, Us1 and Us2 are variables for voltage thresholds to which values can be assigned in the above-mentioned blocks, for example from model calculations, tables, or characteristic maps.

The sequence moves from block 433 to query 434. This is again comparable to queries 403, 426, and 421 and determines whether a complete system exists. If control system R1 and control system R2 are active, an anti-lock brake system is present, and the sequence moves on to query 435, where a check is carried out to determine which control system is driving the pump, just like in queries 427, 422, and 404. If the pump is being driven, for example, by control system R1 i.e., the traction control system, a control system- and situation-specific threshold voltage is again defined for Us2 in block 436. If, however, control system R2 is actively driving the pump, i.e., if the anti-skid control system is not driving the pump motor, the threshold voltage defined for Us2 in block 433 is used again.

The sequence moves to query 438 from query 434 if a complete system is not present, from query 435 if control system R1 is inactive, and from block 436. Here, another comparison with a voltage threshold, this time with Us2, is carried out, generally by clocking, i.e., if the safety threshold for the voltage Us1 is not reached in query 430. If motor voltage UM does not drop below the reference threshold value of Us2, the sequence moves on to block 440, where the pump is deactivated and period duration TTakt is decremented. To do this, either period duration TTakt is reduced by subtracting time unit dT1 or a counter corresponding to this period duration is decremented by one during each loop pass. However, if the voltage does drop below voltage threshold Us2, the sequence moves directly to block 439, thereby activating the pump. Period duration TTakt is decremented in the case as well. The sequence then returns from block 439 or 440 to the beginning of the process sequence, where another check is carried out in query 402 to determine whether the control system is still active. This means that at least one of what in this case are two possible control systems R1 or R2 is active.

With this method, and thus generally at the beginning of a control operation, the pump is continuously driven for a selectable period of time, e.g., TAnstMax, TAnstMaxA. At the end of this time, pump motor clocking begins with a freely selectable period duration TTakt, depending on the situation and in a manner specific to the control system. The period begins with pump deactivation. Off-time TPaus itself can also be selected. Likewise, an on-time TPein can be selected instead of TPaus, as mentioned above.

Pump motor voltage UM is calculated in each sampling step dT, for example every 10 milliseconds, e.g., by analog/digital conversion in the control unit, and is available to the process sequence. This is advantageous if the maximum cycle time lies between the analog/digital conversion and the output of control signal UP of the pump motor. This enables instantaneous pump motor voltage UM to respond immediately to pump activation or deactivation, during the next cycle, since this voltage immediately reflects the pump load status.

If pump motor voltage UM drops to a value that is less than a voltage threshold Us1, e.g., a safety threshold voltage Uss, immediately after pump deactivation, i.e., during the next cycle, the pump is reactivated for a selectable period of time. This drop in pump motor voltage UM immediately after deactivation indicates a heavy load on the pump during this phase. Consequently, the pump can be driven for a period that is much longer than period duration TTakt during this phase. This critical threshold Us1 can simultaneously serve to prevent the pump motor from remaining at a standstill.

If pump motor voltage UM drops to a value that is less than a further threshold voltage Us2, which can also correspond to safety threshold Us1 or another threshold voltage Us, during normal clocking, the pump is reactivated for the rest of period TTakt.

In this embodiment, the pump motor drive is designed so that pump driving by a control strategy R1 traction control in our example, is independent of drive operations by other control strategy R2 anti-skid control in our example. This can be supported by various parameters and various logic components. Each control strategy, i.e., each control system R1 or R2 (anti-skid control or traction control) can thus intervene in the pump motor clocking operation at any time, e.g., via a flag (Pvoll1 and Pvoll2, respectively, in the above example), depending on the settings. Priority control procedures can avoid additional pump driving conflicts. In the above example, both flags can be set, for example, to allow or deny access to the pump by the traction control system. This makes it possible to intervene in the pump motor clocking operation at any time, thus switching the pump to continuous or full drive, respectively. A modular layout of a pump motor control module can thus be provided in which only one algorithm, i.e., only one basic logic, is used. This module enables independent pump motor clocking of the individual systems, i.e., control arrangements, influencing the braking action for vehicle driving stability and/or safety to be used simultaneously.

The different selectable periods for pump activation and deactivation make it possible to reduce the pump motor speed without sacrificing performance.

Further advantages are obtained by reducing the pump motor current and consequently in dimensioning the pump motor, since it needs to be driven continuously only for a short period of time. The period of full drive can be limited by estimated wheel brake pressures (block 400), especially when reducing the pressure from a high wheel brake pressure level.

A pump motor module can be provided with an additional input for a flag, e.g., Fvoll1. Controlled by control system 1, i.e., by the traction control algorithm, this flag Fvoll1 can immediately suppress clocking for driving the pump, and the pump can be driven in a different mode. Of course, this also applies to all systems, i.e., control arrangements, influencing the braking action (anti-skid control, vehicle dynamics control, etc.) to ensure vehicle driving stability and/or safety.

The above-mentioned embodiments and the conditions they provide can be used to adjust pump driving selectively and according to the pumping request and the mode of operation.

Furthermore, the pump driving method is not limited to hydraulic brake systems. Similarly, it could conceivably be used, for example, in electro-hydraulic, pneumatic, electro-pneumatic, and other similar brake systems.

Different methods for driving a pump in a brake system are provided in the embodiment according to the independent claims by introducing a minimum pump on-time TPein-Min according to the present invention, which can also be used for exclusively clocked control of the pump.

What is claimed is:

1. A method for driving a pump of a brake system, comprising:
   receiving by the pump, in response to a pumping request, at least one control signal, the at least one control signal being constant over at least one time interval, being specifiable, and being formed from a sum of a pulse time and interpulse period of a duty cycle;
   initially connecting the pump to a voltage supply for a specifiable time period;
   after initially connecting the pump and during the duty cycle, energizing the pump for a specifiable time period as a function of at least one condition; and
   stopping the duty cycle for a specifiable period of time, the at least one condition being preventively evaluated before the pump is loaded;
   wherein the at least one condition is an index for an increased pump load in comparison with a pump load in duty cycle mode.

2. A method for driving a pump of a brake system, comprising:
   receiving by the pump, in response to a pumping request, at least one control signal, the at least one control signal being constant over at least one time interval, being specifiable, and being formed from a sum of a pulse time and interpulse period of a duty cycle;
   initially connecting the pump to a voltage supply for a specifiable time period;
   after initially connecting the pump and during the duty cycle, energizing the pump for a specifiable time period as a function of at least one condition; and
   stopping the duty cycle for a specifiable period of time, the at least one condition being preventively evaluated before the pump is loaded;
   wherein the stopping step includes stopping the duty cycle by eliminating the interpulse period.

3. A method for driving a pump of a brake system, comprising:
   receiving by the pump, in response to a pumping request, at least one control signal, the at least one control signal being constant over at least one time interval, being specifiable, and being formed from a sum of a pulse time and interpulse period of a duty cycle;
   initially connecting the pump to a voltage supply for a specifiable time period;
   after initially connecting the pump and during the duty cycle, energizing the pump for a specifiable time period as a function of at least one condition; and
   stopping the duty cycle for a specifiable period of time, the at least one condition being preventively evaluated before the pump is loaded;
   wherein at least one of: i) the at least one condition is selected from a plurality of conditions, and ii) at least one arbitrary logic operation is formed as a condition from the plurality of conditions;
   wherein a logic operation from at least: i) at least one estimated pressure quantity exceeding at least one pressure threshold, and ii) initializing a pressure module, is evaluated as a condition.

4. A method for driving a pump of a brake system, comprising:
   receiving by the pump, in response to a pumping request, at least one control signal, the at least one control signal being constant over at least one time interval, being specifiable, and being formed from a sum of a pulse time and interpulse period of a duty cycle;
   initially connecting the pump to a voltage supply for a specifiable time period;
   after initially connecting the pump and during the duty cycle, energizing the pump for a specifiable time period as a function of at least one condition; and
   stopping the duty cycle for a specifiable period of time, the at least one condition being preventively evaluated before the pump is loaded;
   wherein at least one of: i) the at least one condition is selected from a plurality of conditions, and ii) at least one arbitrary logic operation is formed as a condition from the plurality of conditions;
   wherein a logic operation from at least: i) at least one estimated pressure quantity exceeding at least one pressure threshold, and ii) a positive system deviation, is evaluated as a condition.

5. A method for driving a pump of a brake system, comprising:
   receiving by the pump, in response to a pumping request, at least one control signal, the at least one control signal being constant over at least one time interval, being specifiable, and being formed from a sum of a pulse time and interpulse period of a duty cycle;
   initially connecting the pump to a voltage supply for a specifiable time period;
   after initially connecting the pump and during the duty cycle, energizing the pump for a specifiable time period as a function of at least one condition; and
   stopping the duty cycle for a specifiable period of time, the at least one condition being preventively evaluated before the pump is loaded;
   wherein at least one of: i) the at least one condition is selected from a plurality of conditions, and ii) at least one arbitrary logic operation is formed as a condition from the plurality of conditions;
   wherein a logic operation from at least: i) recognizing a unilateral control, and ii) at least one estimated pressure quantity exceeding at least one pressure threshold, is evaluated as a condition.

6. A method for driving a pump of a brake system, comprising:
   receiving by the pump, in response to a pumping request, at least one control signal, the at least one control signal being constant over at least one time interval, being specifiable, and being formed from a sum of a pulse time and interpulse period of a duty cycle;

initially connecting the pump to a voltage supply for a specifiable time period;

after initially connecting the pump and during the duty cycle, energizing the pump for a specifiable time period as a function of at least one condition; and stopping the duty cycle for a specifiable period of time, the at least one condition being preventively evaluated before the pump is loaded;

wherein at least one of: i) the at least one condition is selected from a plurality of conditions, and ii) at least one arbitrary logic operation is formed as a condition from the plurality of conditions;

wherein a logic operation from at least: i) recognizing a bilateral control, and ii) at least one estimated pressure quantity exceeding at least one pressure threshold, is evaluated as a condition.

7. A method for driving a pump of a brake system, comprising:

receiving by the pump, in response to a pumping request, at least one control signal, the at least one control signal being constant over at least one time interval, being specifiable, and being formed from a sum of a pulse time and interpulse period of a duty cycle;

initially connecting the pump to a voltage supply for a specifiable time period;

after initially connecting the pump and during the duty cycle, energizing the pump for a specifiable time period as a function of at least one condition;

stopping the duty cycle for a specifiable period of time, the at least one condition being preventively evaluated before the pump is loaded; and selecting a maximum pump break time per drive period to ensure a minimum pump running time per elementary drive period.

8. A method for driving a pump of a brake system, comprising:

receiving by the pump, in response to a pumping request, at least one control signal, the at least one control signal being constant over at least one time interval, being specifiable, and being formed from a sum of a pulse time and interpulse period of a duty cycle;

initially connecting the pump to a voltage supply for a specifiable time period;

after initially connecting the pump and during the duty cycle, energizing the pump for a specifiable time period as a function of at least one condition;

stopping the duty cycle for a specifiable period of time, the at least one condition being preventively evaluated before the pump is loaded; and testing a voltage threshold in a definite time interval as a condition of the at least one condition, the pump being energized for the specifiable time period in response to the voltage threshold being reached.

* * * * *

UNITED STATES PATENT AND TRADEMARK OFFICE
CERTIFICATE OF CORRECTION

Figure 4A:
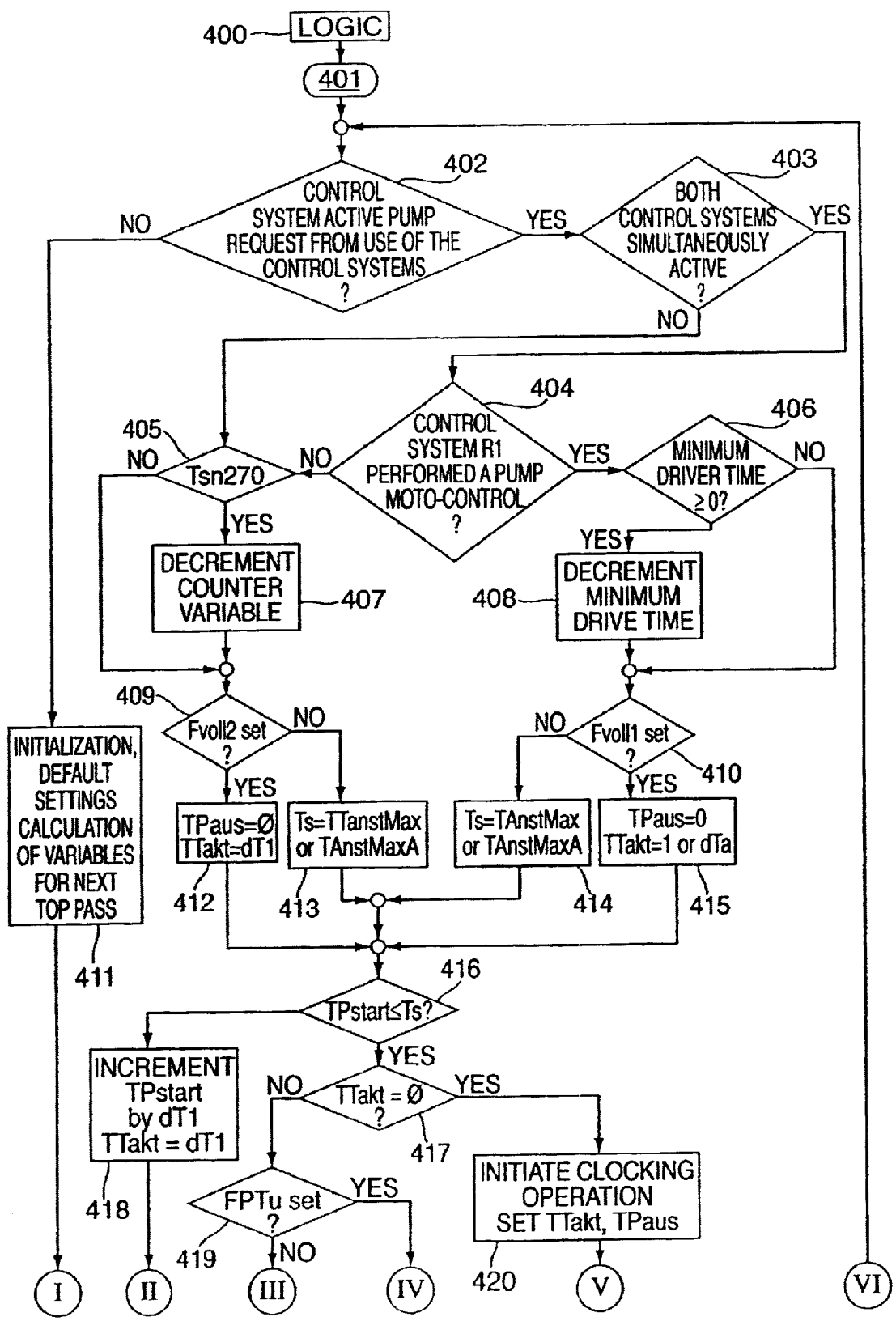
FIG. 4 shows a further embodiment of a method in the form of a flow chart in which, in addition to FIG. 2, multiple controllers are coordinated and a pump is preventively driven on the basis of further conditions in addition to the voltage threshold query.
Figure 4B:
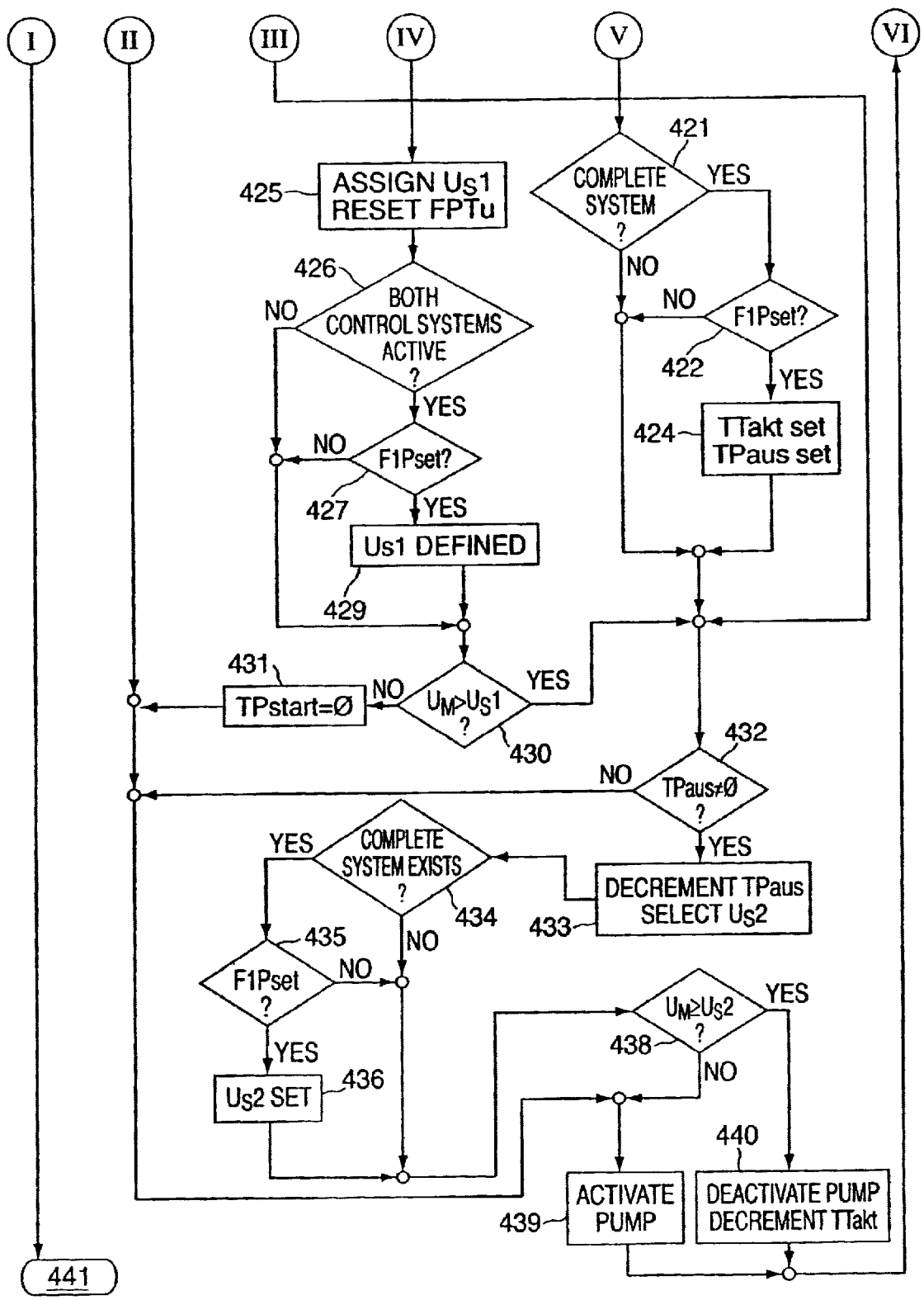

PATENT NO.  : 6,659,568 B2
DATED       : December 9, 2003
INVENTOR(S) : Helmut Wandel It is certified that error appears in the above-identified patent and that said Letters Patent is hereby corrected as shown below:

Column 1,
Line 4, insert -- CROSS-REFERENCE TO RELATED APPLICATIONS --;
Line 8, change "BACKGROUND INFORMATION" to -- FIELD OF THE INVENTION --;
Line 12, change "system according to the preambles of the independent claims" to -- system --;
Line 13, insert -- BACKGROUND INFORMATION --;
Line 31, change "It has been shown that the known" to -- The conventional --;
Line 33, change "The" to -- An --;
Line 39, change "German Patent No. 198 18 174, which is not a prior publication" to -- German Patent Application No. 198 18 174 (not a prior publication) --;
Line 54, change "document" to -- patent --;
Line 63, change "ADVANTAGES OF THE INVENTION" to -- SUMMARY --;
Line 64, change "Initially, the pump" to -- Initially, according to an example embodiment of the present invention, the pump --;

Column 2,
Line 13, change "The method" to -- The method and device --;
Lines 13-14, delete "the device having the independent features of the claims";

Column 3,
Lines 27-33, "Further advantages are ... in the description below" to -- BRIEF DESCRIPTION OF THE DRAWINGS --;
Line 35, change "FIG. 2 shows" to -- FIGS. 2A and 2B show --;
Line 35, change "a possible" to -- an example --;
Line 36, change "sequence and" to -- sequence. --;
Line 40, change "FIG. 4 shows" to -- FIGS. 4A and 4B show --;
Line 43, change "basis" to -- bases --;
Line 46, change "DESCRIPTION OF EMBODIMENTS" to -- DETAILED DESCRIPTION --;
Line 54, change "Application" to -- Application No. --;
Line 60, change "switching means" to -- switch --;
Line 60, change "switching means"(second instance) to -- switch --;
Lines 62, 62-63, 64, 65, 65 and 67, change "comparison means" to -- comparators --;
Line 67, change "comparison means"(second instance) to -- comparator --;

UNITED STATES PATENT AND TRADEMARK OFFICE
CERTIFICATE OF CORRECTION

PATENT NO. : 6,659,568 B2
DATED : December 9, 2003
INVENTOR(S) : Helmut Wandel

It is certified that error appears in the above-identified patent and that said Letters Patent is hereby corrected as shown below:

Column 4,
Line 2, change "comparison" to -- comparator --;
Lines 11 and 51, change "switching means" to -- switch --;
Lines 12 and 62, change "Switching means" to -- Switch --;
Lines 22, 33-34, 35, 45 and 49, change "comparison means" to -- comparators --;

Column 5,
Line 3, change "A particularly important" to -- One --;
Lines 5 and 32, change "comparison means" to -- comparators --;
Lines 19, 21, 26 and 59, change "switching means" to -- switch --;
Line 43, change "conceivable" to -- possible --;
Line 56, change "266" to -- 216 --;

Column 6,
Lines 25 and 59, change "comparison means" to -- comparator --;
Line 67, change "switching means" to -- switch --;

Column 8,
Line 20, change "conceivable" to -- possible --;
Line 44, change "preferred configuration" to -- example configuration --;

Column 9,
Line 11, change "conceivable" to -- possible --;

Column 10,
Line 8, change "a preferred embodiment" to -- an example --;
Line 11, change "conceivable" to -- possible --;
Line 12, change "wold" to -- would --;

Column 11,
Line 55, change "conceivable" to -- possible --;

Column 14,
Line 43, change "conceivable" to -- possible-- and

UNITED STATES PATENT AND TRADEMARK OFFICE
CERTIFICATE OF CORRECTION

PATENT NO. : 6,659,568 B2
DATED : December 9, 2003
INVENTOR(S) : Helmut Wandel

It is certified that error appears in the above-identified patent and that said Letters Patent is hereby corrected as shown below:

Column 17,
Line 10, change "conceivable" to -- possible--.

Signed and Sealed this

Third Day of May, 2005

JON W. DUDAS
*Director of the United States Patent and Trademark Office*